US012574390B2

(12) United States Patent
Floyd et al.

(10) Patent No.: US 12,574,390 B2
(45) Date of Patent: Mar. 10, 2026

(54) UNAUTHORIZED ACTIVITY DETECTION BASED ON USER AGENT STRING

(71) Applicant: Bank of America Corporation, Charlotte, NC (US)

(72) Inventors: De'Angelo Floyd, Charlotte, NC (US); Bryant Coughlin, Green Bay, WI (US); John Raymond Omernik, Wittenberg, WI (US); Brian Kendall Metzner, Lincolnton, NC (US)

(73) Assignee: Bank of America Corporation, Charlotte, NC (US)

( * ) Notice: Subject to any disclaimer, the term of this patent is extended or adjusted under 35 U.S.C. 154(b) by 194 days.

(21) Appl. No.: 18/134,122

(22) Filed: Apr. 13, 2023

(65) Prior Publication Data

US 2024/0348623 A1 Oct. 17, 2024

(51) Int. Cl.
*H04L 9/40* (2022.01)
*G06F 21/62* (2013.01)

(52) U.S. Cl.
CPC ........ *H04L 63/123* (2013.01); *G06F 21/6209* (2013.01)

(58) Field of Classification Search
CPC ........................... H04L 63/123; G06F 21/6209
See application file for complete search history.

(56) References Cited

U.S. PATENT DOCUMENTS

| | | | |
|---|---|---|---|
| 9,148,467 B1 | 9/2015 | Colton et al. | |
| 9,165,299 B1 | 10/2015 | Stowe et al. | |
| 10,165,004 B1 * | 12/2018 | Mehta | H04L 67/02 |
| 10,290,053 B2 | 5/2019 | Priess et al. | |
| 10,873,648 B2 | 12/2020 | Narasimhan et al. | |
| 11,063,960 B2 | 7/2021 | Be'ery et al. | |
| 11,134,094 B2 | 9/2021 | Merza et al. | |
| 2007/0005723 A1 * | 1/2007 | Kato | H04L 69/28 |
| | | | 709/217 |
| 2019/0288852 A1 * | 9/2019 | Shetye | G06F 21/73 |
| 2023/0231837 A1 * | 7/2023 | Islam | H04L 63/1425 |
| | | | 726/3 |
| 2024/0095327 A1 * | 3/2024 | Benkreira | G06N 20/00 |

FOREIGN PATENT DOCUMENTS

| | | |
|---|---|---|
| CA | 2727831 A1 | 12/2009 |
| CA | 2905996 A1 | 10/2014 |

* cited by examiner

*Primary Examiner* — Vance M Little
(74) *Attorney, Agent, or Firm* — Banner & Witcoff, Ltd.

(57) ABSTRACT

Arrangements for cyber threat detection are provided. In some aspects, a request for an enterprise event may be received. The request may be received from a user computing device and may include a user agent string associated with the user computing device. The user agent string may be parsed to identify parameters associated with the request. The request may then be analyzed to determine whether it is unauthorized. Analyzing the request may include comparing the identified parameters to known viable parameters identified from historical hardware and/or software data. Based on the comparing, if the identified parameters match the known viable parameters, the requested event may be processed. If the identified parameters do not match the known viable parameters, the event may be flagged and transmitted to an enterprise organization computing system for further analysis and/or executing of one or more mitigation actions.

20 Claims, 9 Drawing Sheets

110

111

112

Cyber Threat Detection Computing Platform

Processor(s)

Memory(s)

Hardware And Software Data Module
112a

User Agent Processing Module
112b

Parameter Comparison Module
112c

Machine Learning Engine
112d

Threat Detection Control Module
112e

Database
112f

113

Communication Interface(s)

UNAUTHORIZED ACTIVITY DETECTION BASED ON USER AGENT STRING

BACKGROUND

Aspects of the disclosure relate to electrical computers, systems, and devices for detecting unauthorized activity based on a user agent string.

Malicious actors continue to develop new ways to attempt unauthorized activity. One commonly leveraged tactic is to spoof characteristics of an authorized customer interaction by manipulating details of the actual, unauthorized customer interaction. For instance, technical details such as web browser type, web browser version, operating system type, operating system version, and the like, can be manipulated by an unauthorized or malicious actor to attempt to initiate malicious digital interactions with an enterprise organization. Accordingly, it would be advantageous to quickly identify, for any particular point-in-time, characteristics of a user interaction that are authentic to efficiently identify malicious actors.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with identifying unauthorized activity and cyber threats.

In some aspects, a request for an enterprise event may be received. The request may be received from a user computing device and may include a user agent string associated with the user computing device. The user agent string may be parsed to identify one or more parameters associated with the request. The request may then be analyzed to determine whether it is unauthorized. In some examples, analyzing the request may include comparing the identified parameters to known viable parameters identified from historical hardware and/or software data. In some examples, a machine learning model may be used to evaluate the request to determine whether it is unauthorized.

Based on the comparing, if the identified parameters match the known viable parameters, the requested event may be processed. If the identified parameters do not match the known viable parameters, the event may be flagged and transmitted to an enterprise organization computing system for further analysis and/or executing of one or more mitigation actions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
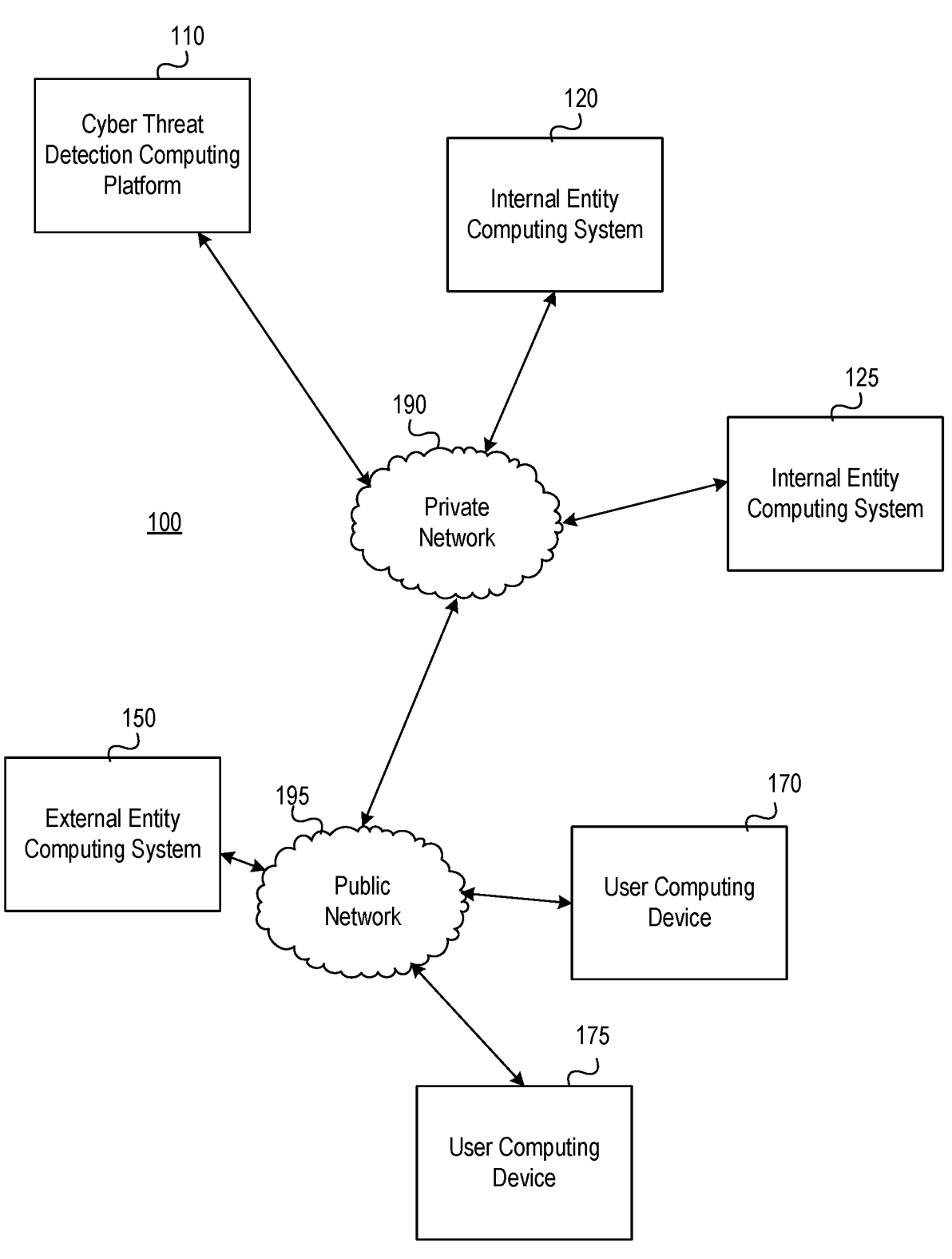
FIGS. 1A and 1B depict an illustrative computing environment for implementing cyber threat detection functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, malicious actors continue to attempt to initiate digital interactions that are, in fact, unauthorized activity or may constitute cyber threats. By manipulating characteristics of digital interactions, such as requests for transactions or event processing, the malicious actors may appear to be authorized users in an effort to initiate unauthorized activity. However, as each digital interaction may generate a user agent string, it would be advantageous to evaluate parameters or characteristics of the user agent string to detect this unauthorized activity.

Accordingly, as discussed more fully herein, an enterprise organization may leverage the historical data obtained from previous requests for events. The historical data may include hardware and/or software data associated with requests received from a mobile application executing on a user device, from an online session via a web browser, or the like. The historical data may be analyzed to identify parameters of event requests, or combinations of parameters, that are considered known viable parameters or combinations of parameters for various points in time. For instance, combinations of devices, operating systems, operating system versions, web browser, web browser versions, and the like, that are known viable combinations may be identified based on historical events that were successfully processed and were not unauthorized activity. The known viable parameters or combinations may be associated with a date, date range, time stamp, or the like, to identify when these parameters or combinations were likely in use (e.g., as determined from the historical data, based on version release dates, and the like). Accordingly, if a combination of parameters that does not match these known viable parameters (e.g., either based on the particular combination of parameters or a time or date on which the request was received) the event may be determined to be unauthorized or likely unauthorized. For instance, some sort of script or automation may be being used on the back end to log in to the customer's account.

Accordingly, as requests for enterprise events are received by the enterprise organization, the user agent string associated with the request may be parsed to identify parameters of the request. The identified parameters may be compared to the known viable parameters or combinations to determine whether a match exists. If so, the event may be considered authorized and may be processed to may be transmitted for standard event processing/evaluation. If the parameters or combinations do not match known viable parameters or combinations, the event may be flagged as unauthorized or likely unauthorized and one or more mitigation actions may be identified and executed.

These and various other arrangements will be discussed more fully below.

Figure 1B:
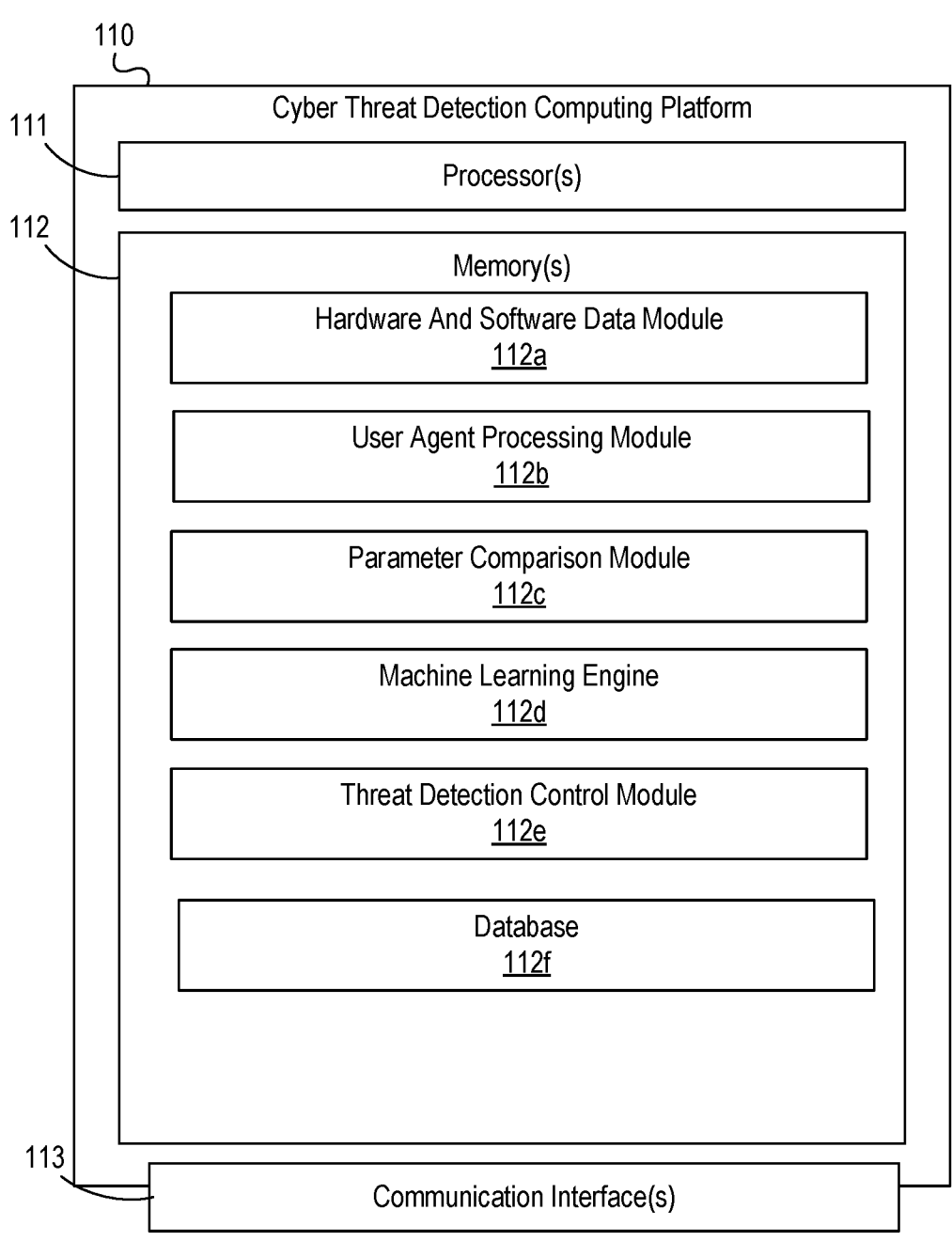

Aspects described herein may be implemented using one or more computing devices operating in a computing environment. For instance, FIGS. 1A-1B depict an illustrative computing environment for implementing a cyber threat detection system in accordance with one or more aspects described herein. Referring to FIG. 1A, computing environment 100 may include one or more computing devices and/or other computing systems. For example, computing environment 100 may include cyber threat detection computing platform 110, internal entity computing system 120, internal entity computing system 125, external entity computing system 150, user computing device 170 and/or user computing device 175. Although two internal entity computing systems 120, 125, one external entity computing system 150 and two user devices 170, 175 are shown, any number of systems or devices may be used without departing from the invention.

Cyber threat detection computing platform 110 may be configured to provide intelligent, dynamic and efficient cyber threat detection based on user agent string analysis. In some examples, cyber threat detection computing platform 110 may receive a request for an enterprise event, such as opening an account at an enterprise organization, such as a financial institution. The request for an enterprise event may be received from a user computing device, such as user computing device 170, user computing device 175, or the like. The request for the enterprise event may include a user agent string associated with the session in which the enterprise event was requested. For instance, cyber threat detection computing platform may receive a user agent string associated with the request that may include a type of device from which the request was received, a browser or type of browser, a browser version, an operating system on the device from which the request was received, an operating system version, and the like.

Cyber threat detection computing platform 110 may parse the user agent string to extract parameters of the request. The parameters may then be analyzed by the cyber threat detection computing platform 110 to determine whether one or more combinations of parameters extracted from the user agent string were possible at that point in time, or at another point in time. For instance, the parameters of the request, or one or more combinations thereof, may be compared to historical data including combinations of parameters that are possible at a particular point in time. The comparison may then yield an output which may include a flag that the parameters or combination of parameters are not possible and constitute or likely constitute a cyber threat, a score indicating a likelihood that the parameters or combination of parameters are likely a cyber threat, or the like. In some examples, based on the output, cyber threat detection computing platform 110 may deny the requested event, may transmit the output and additional details for further analysis (e.g., to further evaluate whether a bot or emulator is being used), and the like.

Internal entity computing system 120 and/or internal entity computing system 125 may be or include or more computing devices (e.g., servers, server blades, or the like) and/or one or more computing components (e.g., memory, processor, and the like) and may be configured to host or execute one or more applications or systems for further analyzing potential cyber threat data. For instance, internal entity computing system 120 and/or internal entity computing system 125 may be associated with an unauthorized activity detection department and may receive outputs from the cyber threat detection computing platform 110 for further analysis. In some examples, internal entity computing system 120 may be associated with a first line of business of the enterprise organization and internal entity computing system 125 may be associated with a second, different line of business of the enterprise organization.

External entity computing system 150 may be or include or more computing devices (e.g., servers, server blades, or the like) and/or one or more computing components (e.g., memory, processor, and the like) and may be configured to host, transmit, and the like, data associated with devices, browsers, browser versions, operating system, operating system versions, and the like. For instance, external entity computing system 150 may include publicly available data associated with release dates, availability dates, and the like, of various hardware devices, software applications or systems, and the like. In some examples, external entity computing system 150 may be operated by an entity external to the enterprise organization, such as a third party vendor, and may also provide publicly available cyber threat data.

User computing device 170 and/or user computing device 175 may be or include one or more user computing devices, such as mobile devices, laptops, smart phones, tablets, wearable devices, desktop computers, and the like. User computing device 170 and/or user computing device 175 may be configured to receive and transmit one or more enterprise event requests to cyber threat detection computing platform 110. For instance, user computing device 170 and/or user computing device 175 may include one or more operating systems, browsers, and the like, configured to enable a user to request an enterprise event, such as opening a new account. In some examples, user computing device 170 and/or user computing device 175 may be operated by threat actors and may spoof one or more of a browser, browser version, browser extensions, operating system, or the like when transmitting an enterprise event request (e.g., to avoid identification or detection as a threat actor).

As mentioned above, computing environment 100 also may include one or more networks, which may interconnect one or more of cyber threat detection computing platform 110, internal entity computing system 120, internal entity computing system 125, external entity computing system 150, user computing device 170 and/or user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, cyber threat detection computing platform 110, internal entity computing system 120, and/or internal entity computing system 125, may be associated with an enterprise organization (e.g., a financial institution), and private network 190 may be associated with and/or operated by the organization, and may include one or more networks (e.g., LANs, WANs, virtual private networks (VPNs), or the like) that interconnect cyber threat detection computing platform 110, internal entity computing system 120, and/or internal entity computing system 125, and one or more other computing devices and/or computer systems that are used by, operated by, and/or otherwise associated with the organization. Public network 195 may connect private network 190 and/or one or more computing devices connected thereto (e.g., cyber threat detection computing platform 110, internal entity computing system 120, internal entity computing system 125) with one or more networks and/or computing devices that are not associated with the organization. For example, external entity computing system 150, user computing device 170 and/or user computing device 175 might not be associated with an organization that operates private network 190 (e.g., because external entity computing system 150, user computing device 170 and/or user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 150, user computing device 170 and/or user computing device 175 to private network 190 and/or one or more computing devices connected thereto (e.g., cyber threat detection computing platform 110, internal entity computing system 120, internal entity computing system 125).

Referring to FIG. 1B, cyber threat detection computing platform 110 may include one or more processors 111, memory 112, and communication interface 113. A data bus may interconnect processor(s) 111, memory 112, and communication interface 113. Communication interface 113 may be a network interface configured to support communication between cyber threat detection computing platform 110 and one or more networks (e.g., network 190, network 195, or the like). Memory 112 may include one or more program modules having instructions that when executed by processor(s) 111 cause cyber threat detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of cyber threat detection computing platform 110 and/or by different computing devices that may form and/or otherwise make up cyber threat detection computing platform 110.

For example, memory 112 may have, store and/or include hardware and software data module 112a. Hardware and software data module 112a may store instructions and/or data that may cause or enable the cyber threat detection computing platform 110 to receive data related to a plurality of hardware devices and associated browsers, browser versions, operating systems, operating system versions, and the like. In some examples, the hardware and software data may be extracted from internal data indicating particular hardware devices, the operating system types and versions associated therewith, the browsers used, and the like. The data may also include a time stamp or date range in which a version was used, was launched, was removed from use, or the like. In some examples, the data may be received from one or more outside sources, such as external entity computing system 150. The outside source may include a vendor providing publicly available information related to versions of operating systems, browsers, and the like, as well as devices associated therewith.

Cyber threat detection computing platform 110 may further have, store and/or include user agent string processing module 112b. User agent string processing module 112b may store instructions and/or data that may cause or enable the cyber threat detection computing platform 110 to receive an enterprise event request including a user agent string associated with the enterprise event request and parse the user agent string to extract parameters of the request, such as device from which the request was received, browser used to initiate the request, browser version, operating system of the device, operating system version, and the like. In some examples, parameters such as browser extensions associated with the browser may be extracted.

Cyber threat detection computing platform 110 may further have, store and/or include parameter comparison module 112c. Parameter comparison module 112c may store instructions and/or data that may cause or enable the cyber threat detection computing platform 110 to compare the parameters extracted from the user agent string, alone and/or in one or more combinations, to previously known parameters or combinations of parameters (e.g., from hardware and software data module 112a). For instance, a combination of an operating system and browser version from the user agent string may be compared to known possible combinations of operating systems and browser versions to determine whether the combination is possible or likely. In some examples, the parameter comparison module 112c may generate a binary output of possible or not possible, based on the comparison. Additionally or alternatively, the output may be a score that may be compared to one or more thresholds to determine whether the combination is possible, not possible, likely not possible, or the like.

In some examples, machine learning may be used to compare the extracted parameters to known possible parameters or parameter combinations. For instance, cyber threat detection computing platform 110 may further have, store and/or include machine learning engine 112d. Machine learning engine 112d may store instructions and/or data that may cause or enable the cyber threat detection computing platform 110 to train, execute, validate and/or update one or more machine learning models that may be used to determine a likelihood that one or more parameters, or one or more combinations of parameters are possible, not possible, likely not possible, or the like. In some examples, the machine learning model may be trained (e.g., using historical data related to parameters and combinations of parameters such as device, device type, operating system, operating system version, browser, browser version, browser extensions detected, and the like) to identify patterns or sequences in data that indicate or output a likelihood that data parsed from a user agent string received from a request is a possible combination. The machine learning model may, in some arrangements, use as inputs the parameters extracted from the user agent string (e.g., operating system, device, browser, browser version, and the like) and, based on execution of the model, output a binary output of possible or not possible, output a score indicative of a likelihood that the parameters or combination of parameters is possible, and the like. For instance, an operating system released in 2015 is not likely capable of running a browser version from 2022 (e.g., as may be used in spoofed requests). Accordingly, the model may output that the combination of parameters from the user agent string is not possible or may generate an output score indicating a likelihood that the combination is not possible. Any further analysis performed on the request associated with the user agent string may generate further outputs or information indicating possibility and may be used to update, validate or further train the machine learning model. Accordingly, the model may be continuously or near continuously updated or validated to continue to improve accuracy.

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models.

Cyber threat detection computing platform 110 may further have, store and/or include threat detection control module 112e. Threat detection control module 112e may store instructions and/or data that may cause or enable the cyber threat detection computing platform 110 to generate one or more actions based on the results of comparing the extracted parameters to historical parameters (e.g., via the machine learning model). For instance, based on an output of the machine learning model, the requested enterprise event may be denied and a notification generated and transmitted to the user device from which the request was received. Additionally or alternatively, the request for enterprise event, and associated outputs, analysis, and the like, may be transmitted to an internal entity system for further analysis or evaluation. For instance, the request may be transmitted to an unauthorized activity detection and action team to determine and/or execute an appropriate mitigation action.

Cyber threat detection computing platform 110 may further have, store, and/or include database 112f. Database 112f may store data used by machine learning engine 112d, cyber threat detection computing platform 110, and the like, to evaluate user agent strings for unauthorized activity.

FIGS. 2A-2D depict one example illustrative event sequence for implementing cyber threat detection functions in accordance with one or more aspects described herein. The events shown in the illustrative event sequence are merely one example sequence and additional events may be added, or events may be omitted, without departing from the invention. Further, one or more processes discussed with respect to FIGS. 2A-2D may be performed in real-time or near real-time.

Figure 2A:
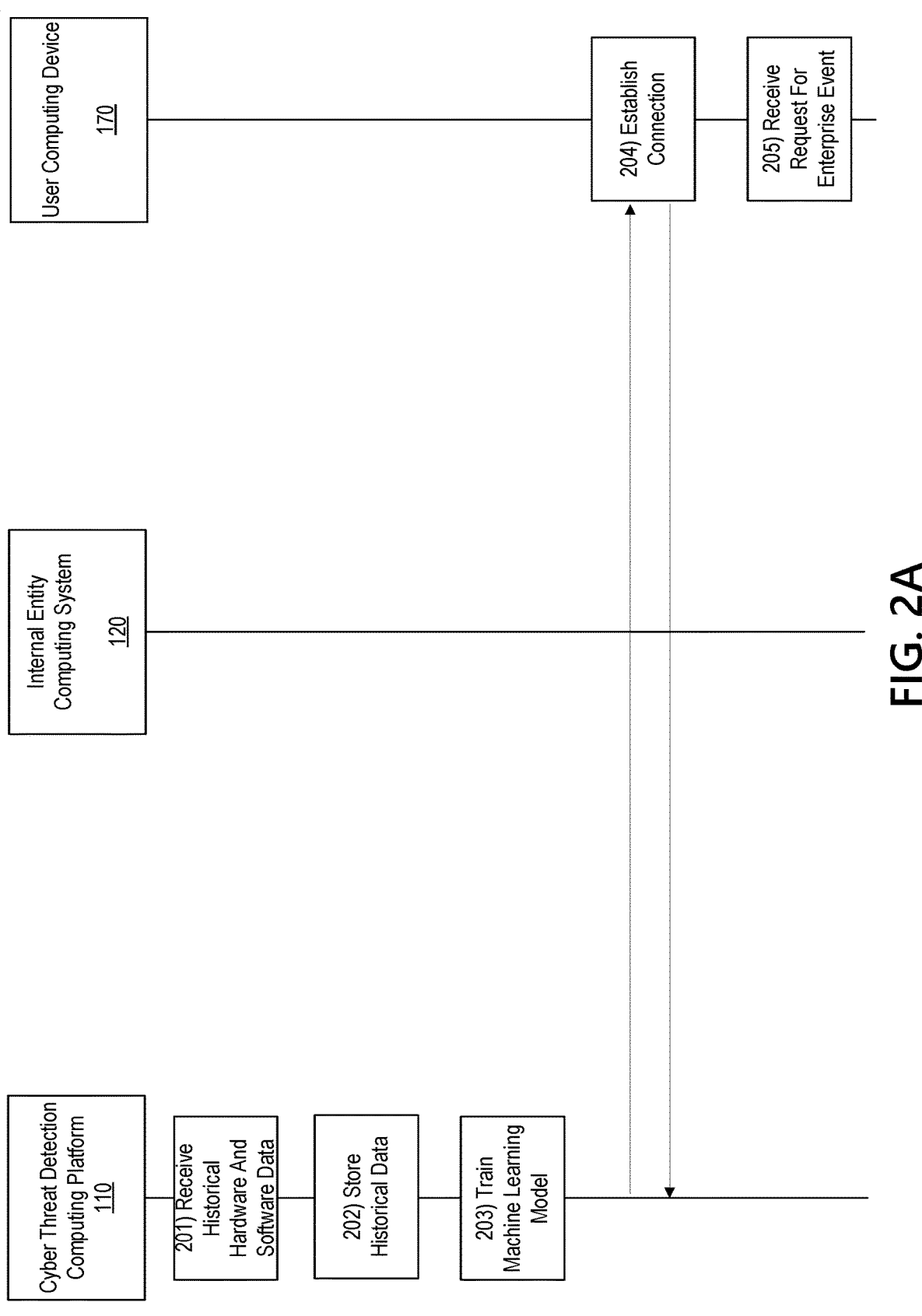
FIGS. 2A-2D depict an illustrative event sequence for implementing cyber threat detection functions in accordance with one or more aspects described herein.

With reference to FIG. 2A, at step 201, cyber threat detection computing platform 110 may receive hardware and/or software data associated with historical requests for enterprise events. For instance, cyber threat detection computing platform 110 may receive hardware data and/or software data associated with devices from which historical requests for enterprise events were received. In some examples, the hardware and/or software data may include operating system information, browser information, version information, browser extension information, device type information, and the like. In some examples, the hardware and/or software data may include time stamp or date information related to when the data was received (e.g., at what point in time the historical data was received by the enterprise organization or third party from which the cyber threat detection computing platform 110 is receiving the data, or the like), release date information (e.g., a release date associated with a version of an operating system, browser, or the like), and the like. In some examples, data may be received from systems internal to the enterprise organizing implementing the cyber threat detection computing platform 110. Additionally or alternatively, the data may be received from a third party, such as a vendor.

At step 202, the received hardware and/or software data may be stored by the cyber threat detection computing platform 110.

At step 203, the received hardware and/or software data may be used to train a machine learning model. For instance, the received historical hardware and/or software data may be used to train the machine learning model to output a likelihood that parameters extracted from a user agent string are likely unauthorized activity. In some examples, labelled data associated with historical requests for enterprise events that were unauthorized activity and other requests that were authorized activity, may be used to train the machine learning model. Additionally or alternatively, unsupervised learning may be used to train the machine learning model.

At step 204, user computing device 170 may connect to cyber threat detection computing platform 110. For instance, a first wireless connection may be established between user computing device 170 and cyber threat detection computing platform 110. Upon establishing the first wireless connection, a communication session may be initiated between user computing device 170 and cyber threat detection computing platform 110.

At step 205, user computing device 170 may receive a request for an enterprise event. For instance, a user may input a request for an enterprise event, such as opening a new account at the enterprise organization, via, for instance, a touch screen, keypad, or other input device of the user computing device 170. The request may be made via an application executing on the user computing device 170 (e.g., via an enterprise organization application such as a mobile banking application) or via an enterprise organization website via a browser session.

Figure 2B:
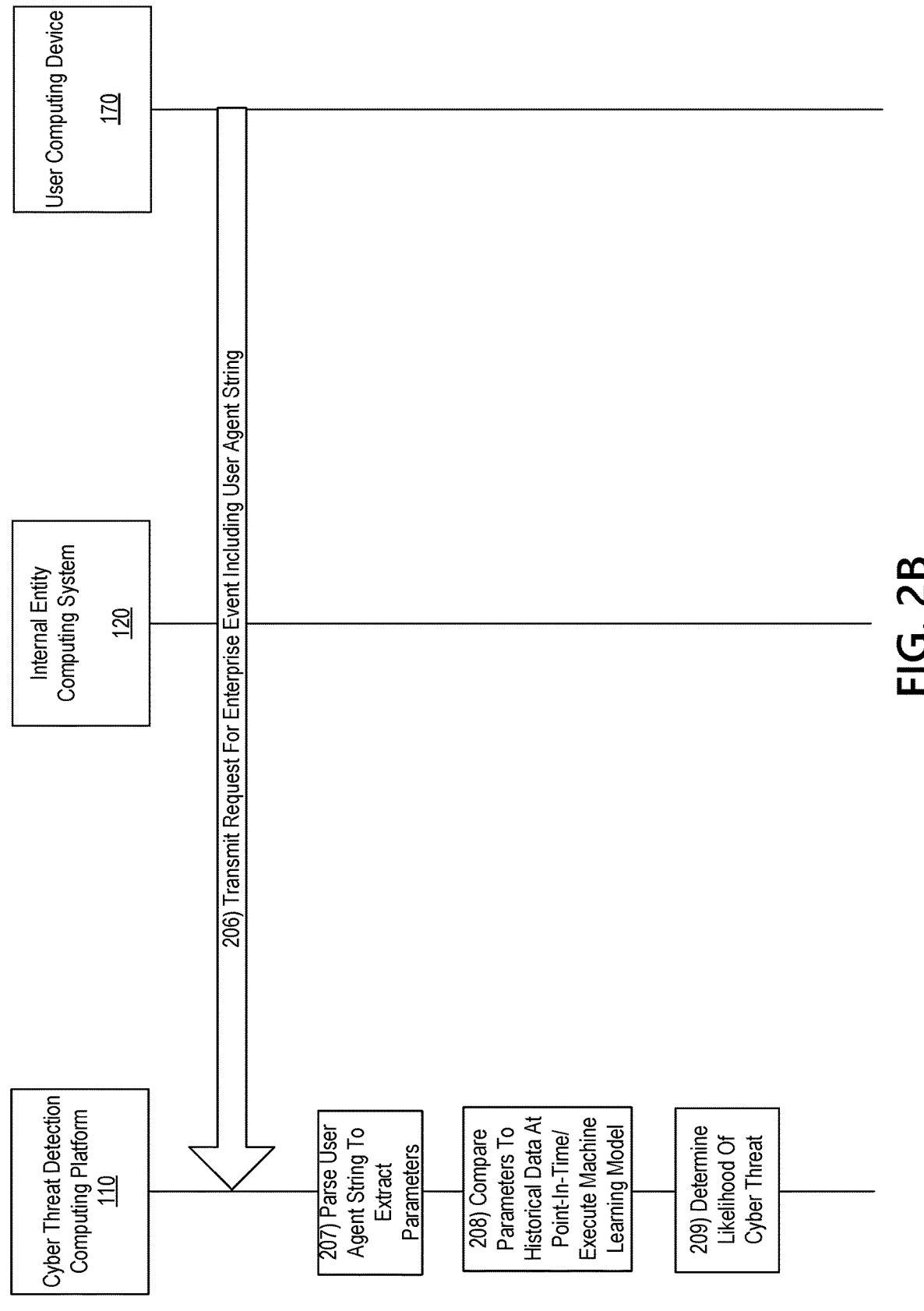

With reference to FIG. 2B, at step 206, the user computing device 170 may transmit or send the enterprise event request to the cyber threat detection computing platform 110. For instance, the user computing device 170 may transmit or send the enterprise event request during the communication session initiated upon establishing the first wireless connection. The enterprise event request may include the user agent string associated with the device, software, and the like, used to generate the request.

At step 207, cyber threat detection computing platform 110 may parse the user agent string to extract parameters of the request. For instance, the device from which the request was received, operating system, operating system version, browser, browser version, browser extensions detected, and the like, may be extracted from the user agent string.

At step 208, the extracted parameters, and/or one or more combinations thereof, may be compared to historical hardware and software parameters, and/or one or more combinations thereof, to determine whether the user agent string associated with the enterprise event request indicates unauthorized activity. In some examples, the machine learning model may receive, as inputs, the extracted parameters from the user agent string, and, based on execution of the machine learning model, may output a binary output indicating whether the parameters are possible (e.g., authorized) or not possible (e.g., unauthorized). In some examples, the machine learning model may output a score indicative of a likelihood that the parameters or combinations are possible (e.g., authorized).

In some examples, comparing the parameters may include comparing combinations of parameters for the particular point in time at which the request was received to determining whether the combination was possible or likely. Accordingly, the arrangements described herein may be executed in real-time to determine whether parameters are possible at the current point-in-time, or may be executed on historical data to provide further analysis in determining whether previously received enterprise event requests were not possible or likely unauthorized activity. Accordingly, the combinations of parameters (e.g., operating system, browser, or the like) may be compared to combinations known to be possible or likely for the point-in-time being considered (e.g., for a real-time evaluation, current data for available operating systems and browsers may be used, while when evaluating historical or previously received requests, combinations available at that particular point-in-time may be considered). Accordingly, in one example, if a particular device appears to be running an operating system that predates the device by many years, that is likely to be identified as not possible or likely unauthorized activity because it is unlikely that the new device would be running an old operating system. Various other combinations of parameters at points-in-time may be considered without departing from the invention.

At step 209, a likelihood of a cyber threat or unauthorized activity may be determined. For instance, the output of the comparison or from the machine learning model may be analyzed to determine whether the request for enterprise event is possible or not possible. In some examples, determining the likelihood of a cyber threat or unauthorized activity may include comparing the score generated by the machine learning model to one or more thresholds. If the score is greater than one or more thresholds, the request may be deemed likely unauthorized activity and mitigating actions may be executed. In arrangements in which a binary output is generated, if the comparison indicates that the parameters or combination of parameters are not possible, mitigating actions may be identified.

Figure 2C:
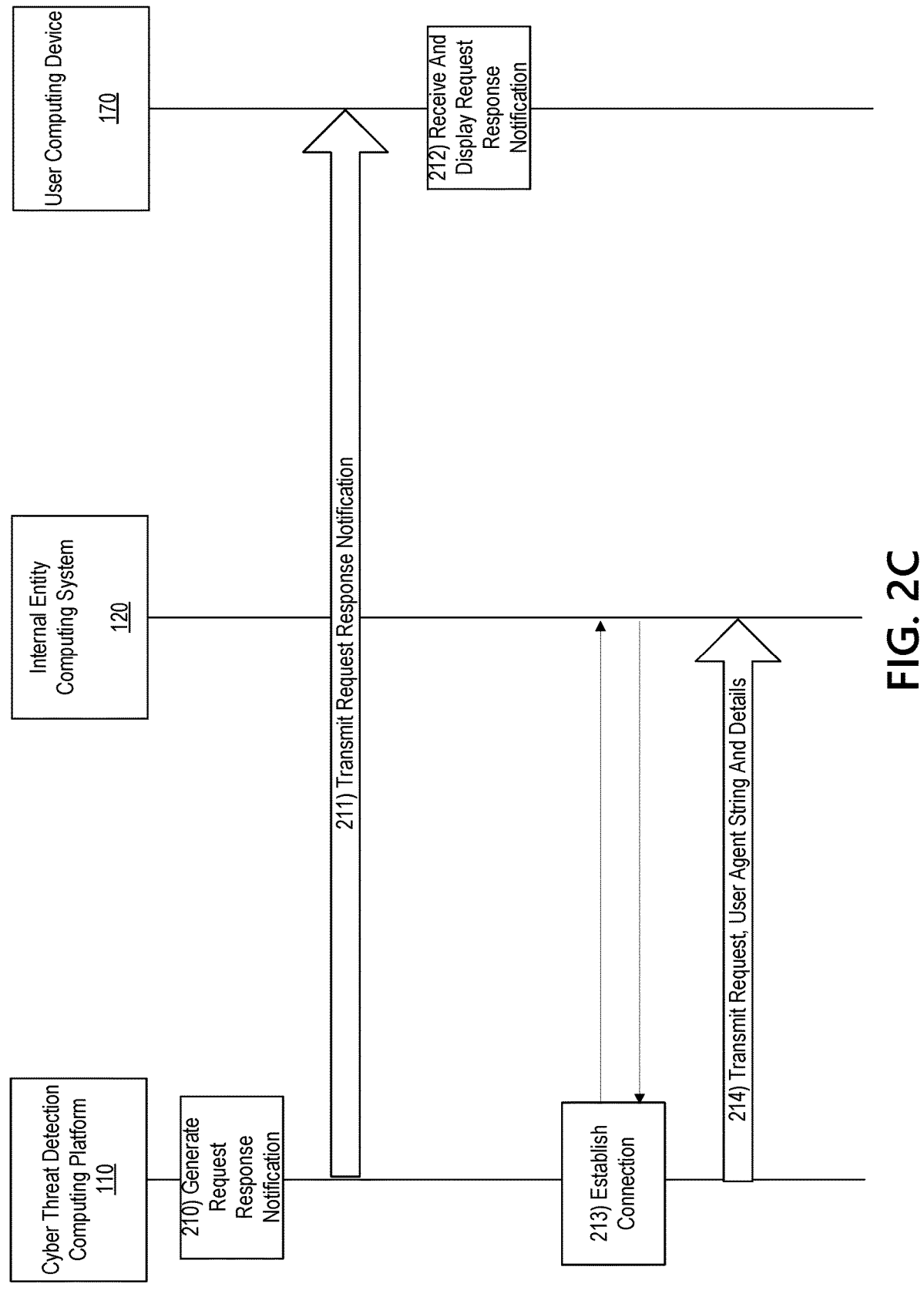
Figure 4:
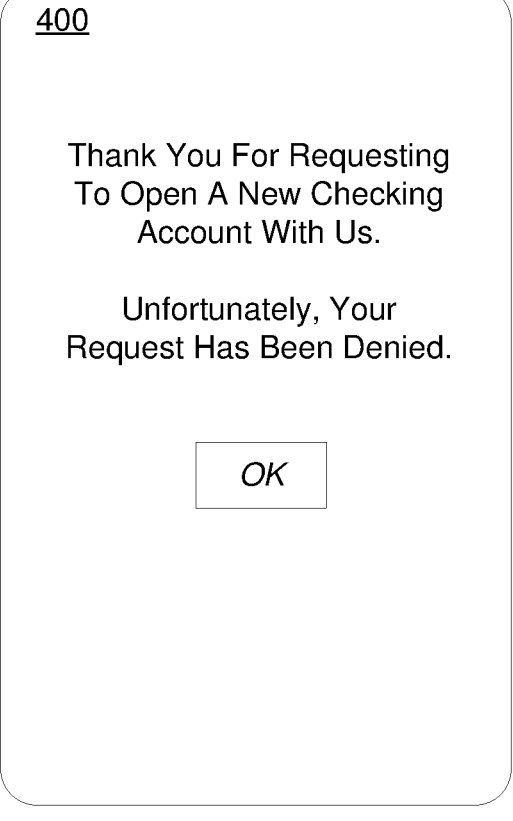
FIG. 4 illustrates an example user interface that may be generated in accordance with one or more aspects described herein.

With reference to FIG. 2C, at step 210, cyber threat detection computing platform 110 may generate a notification including a response to the request for enterprise event. For instance, if the enterprise event request was deemed not possible or likely unauthorized, in some examples, the request may be denied. FIG. 4 illustrates one example user interface 400 that includes an indication that the requested enterprise event was denied. In some examples, such as shown in FIG. 4, additional details related to why the request was denied might not be provided in the notification (e.g., to allow additional time to investigate and identify unauthorized actors). Alternatively, details related to the denial may be included in the notification. In other examples, if the event was deemed possible or not likely unauthorized, a notification indicating processing of the requested event may be generated.

At step 211, the request response notification may be transmitted by the cyber threat detection computing platform 110 to the user computing device 170. In some examples, transmitting or sending the notification may cause the notification to be displayed on a display of the user computing device 170.

At step 212, user computing device 170 may receive and display the notification.

At step 213, cyber threat detection computing platform 110 may connect internal entity computing system 120. For instance, a second wireless connection may be established between cyber threat detection computing platform 110 and internal entity computing system 120. Upon establishing the second wireless connection, a communication session may be initiated between cyber threat detection computing platform 110 and internal entity computing system 120.

At step 214, the enterprise event request, user agent string and associated analysis, as well as the output indicating the request is likely unauthorized may be transmitted by the cyber threat detection computing platform 110 to the internal entity computing system 120. For instance, the data may be transmitted or sent during the communication session initiated upon establishing the second wireless connection. In some examples, internal entity computing system 120 may be associated with an unauthorized activity detection group that may further analyze the enterprise event request and associated data to investigate the request, confirm unauthorized activity, identify unauthorized actors, generate mitigating actions, and the like.

Figure 2D:
Figure 2D:
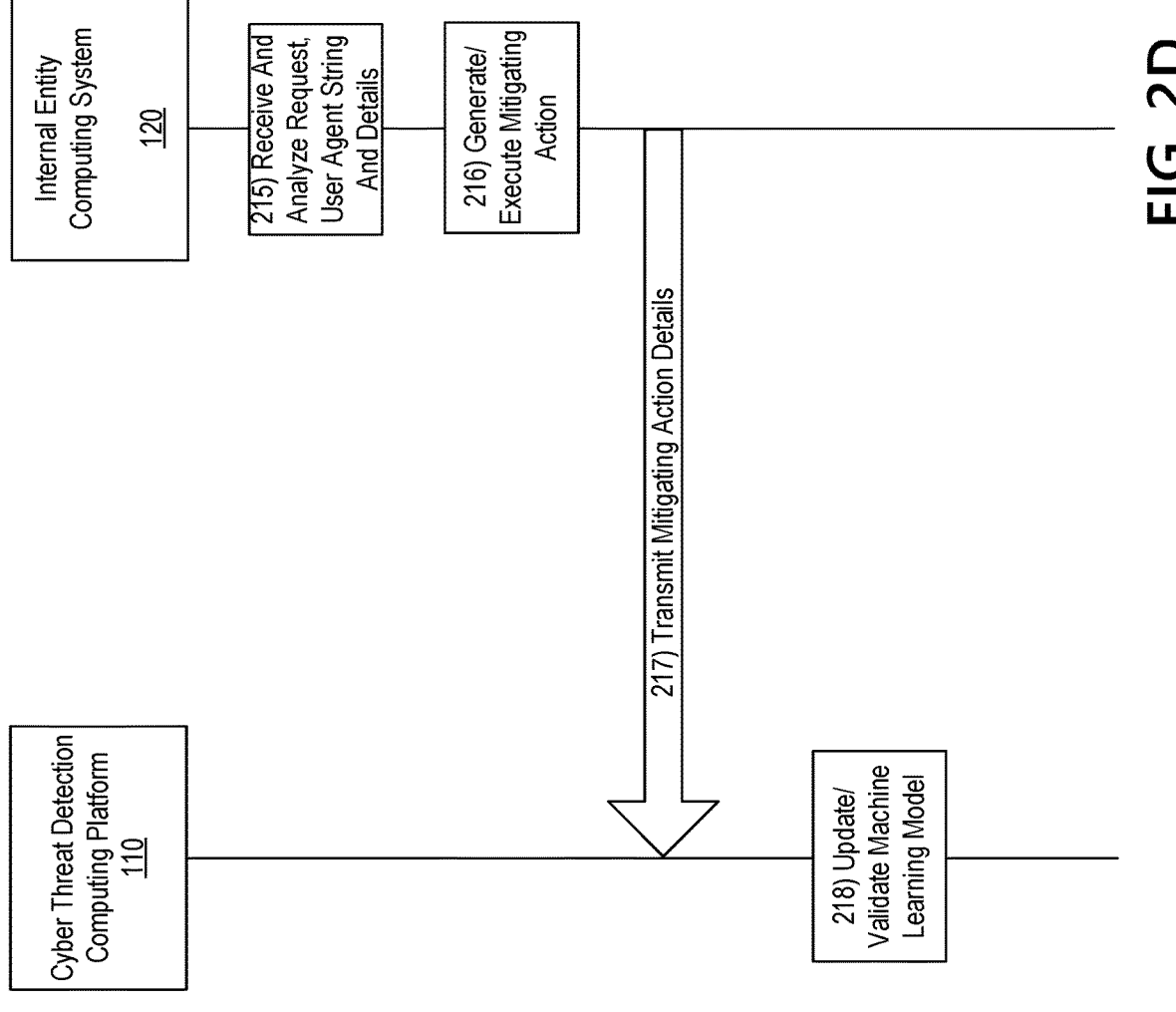

With reference to FIG. 2D, at step 215, internal entity computing system 120 may receive and analyze the enterprise event request, user agent string data, output indicating likely unauthorized activity, and the like. Based on the analyzing, at step 216, one or more mitigating actions may be identified or generated and executed. For instance, an internet protocol address associated with the request may be flagged, user data associated with the request may be flagged and the like. In some examples, the analysis may confirm that the request was unauthorized activity which may cause one or more systems to flag similar requests, disable any events that were completed during the analysis (e.g., if the event was potentially unauthorized the event might not have been denied in real-time but after further analysis might be denied), or the like. Any identified mitigating actions may be executed (e.g., by the internal entity computing system 120 or other systems).

At step 217, details associated with the outcome of the analysis, mitigating actions executed, and the like, may be transmitted by the internal entity computing system 120 to the cyber threat detection computing platform 110.

At step 218, the details may be received and used to update, validate and/or further train the machine learning model to continuously improve accuracy of the model.

Figure 3:
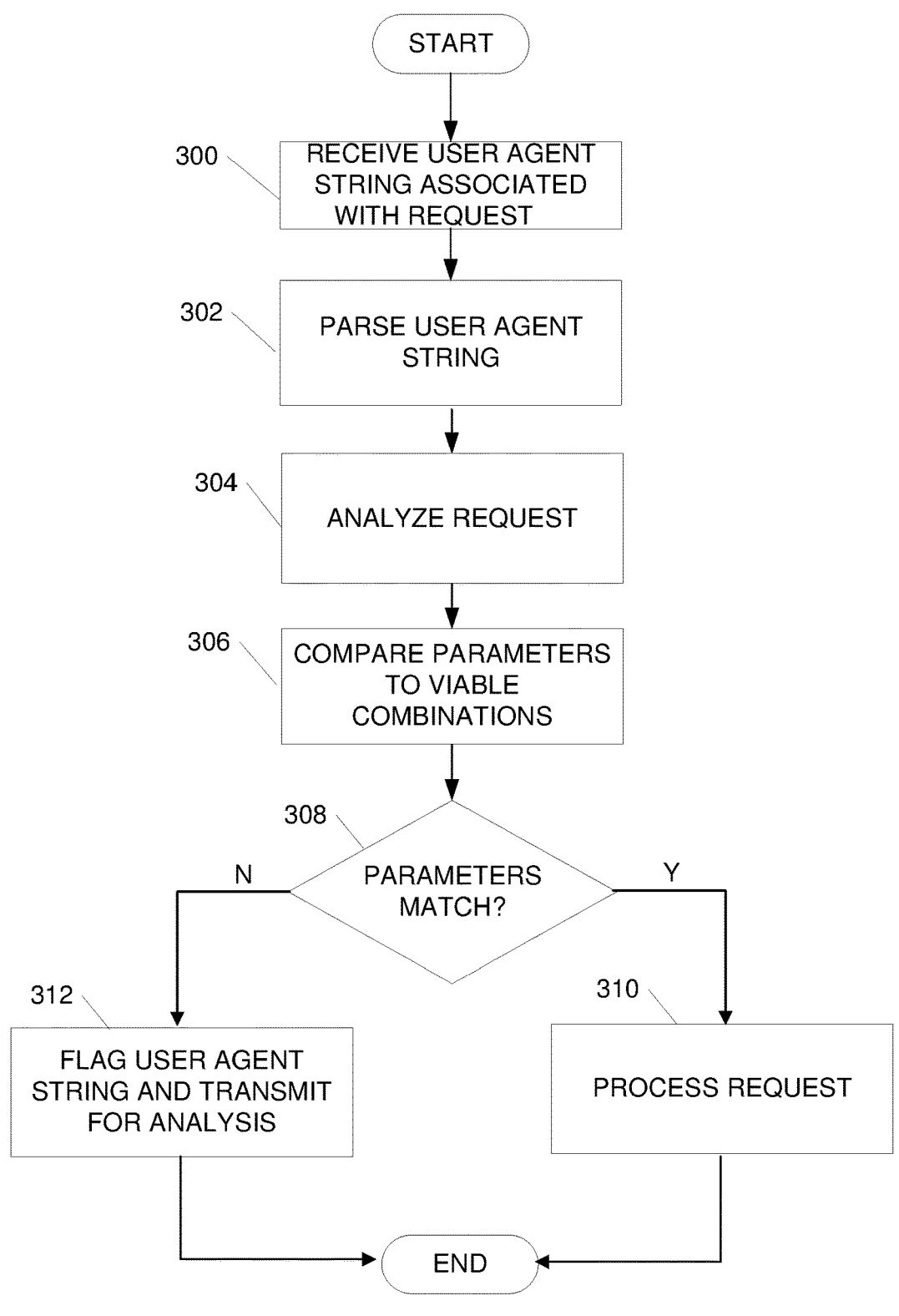
FIG. 3 depicts an illustrative method for implementing cyber threat detection functions in accordance with one or more aspects described herein.

FIG. 3 is a flow chart illustrating one example method of implementing cyber threat detection functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, an enterprise event request may be received by a computing platform, such as cyber threat detection computing platform 110. The enterprise event request may include a user agent string associated with the device from which the request was received. The request and associated user agent string may be received at a first time. In some examples, the first time may be real-time. In other examples, the first time may be a historical time (e.g., a time occurring in the past) and the request may be analyzed for potential unauthorized activity.

At step 302, the cyber threat detection computing platform 110 may parse the user agent string to identify one or more parameters associated with the request. In some examples, the parameters may include one or more of: a device type, an operating system, an operating system version, a browser, a browser version, browser extensions detected, and the like. In some arrangements, the parameters may include at least two of the parameters listed.

At step 304, the cyber threat detection computing platform 110 may analyze the request. For instance, the cyber threat detection computing platform 110 may compare the parameters of the request to known viable combinations of parameters for the first time at step 306. For instance, based on the time at which the request was received, one or more combinations of parameters (e.g., devices, operating systems, browsers, versions, and the like) may be known to be viable or possible, while others may be impossible or not viable. In some examples, the known viable combinations may be determined from historical enterprise event data including hardware and/or software associated with a plurality of events received at a plurality of points-in-time. Additionally or alternatively, the known viable combinations may be based on release date data received from, for instance, a vendor and indicating release dates of devices, browser versions, operating system versions, and the like.

In some examples, analyzing the request may be performed using a machine learning model. For instance, the machine learning model may receive, as inputs, the identified parameters from the request and, based on execution of the model, may output a binary output of whether the request is authorized or unauthorized, a score indicating a likelihood that the request is unauthorized, or the like.

At step 308, a determination may be made as to whether the identified parameters, or combinations thereof, from the request match one or more known viable parameters or combinations of parameters. If the parameter match, in some examples, the request may be processed at step 310. In some arrangements, processing the request may include executing one or more additional unauthorized activity processes to confirm the request is authorized.

If the parameters do not match as step 308, the user agent string and request may be flagged as potentially unauthorized and the request and analysis may be transmitted to an enterprise computing system for further investigation or analysis at step 312.

As discussed above, analyzing parameters extracted from a user agent string associated with an enterprise event request may provide an efficient arrangement for quickly identifying potential unauthorized activity. By leveraging the vast amounts of historical data associated with previous requests, the enterprise organization may rely on easily accessible data to build known parameters or combinations of parameters associated with authorized requests. In some examples, the arrangements described herein may provide a first level filter for quickly identifying event requests that are very likely unauthorized activity. For instance, if a particular type of mobile device provided by a first provider typically runs a first operating system, and the user agent string indicates that the event request includes the particular type of mobile device but with a second operating system associated a competitor provider, the parameters of the event are likely manipulated and indicate unauthorized activity.

In another example, if the event request is received and analyzed in real-time but the browser version appears to be more than 10 years old, the parameters of the event are likely manipulated and indicate unauthorized activity.

Alternatively, if the user agent string indicates an operating system from 2021 and a browser version from 2022, that combination is likely identified as a known viable combination (e.g., the historical data likely includes numerous previously received events that include that combination of operating system various and browser version) and the event may be deemed likely authorized activity. Accordingly, the arrangements described herein leverage the vast amounts of enterprise organization data to understand what is a known viable combination of user agent string parameters at any point-in-time.

Although several aspects of the arrangements are directed to evaluating operating systems, operating system versions, web browsers, web browser versions, and the like, browser extensions may also be considered in determining potential unauthorized activity. For instance, browser extensions detected might not be compatible with the browser version detected (e.g., based on release dates determined from historical data, or the like). Accordingly, that event request may be deemed unauthorized or potentially unauthorized.

In addition, as new versions of operating systems and browsers are released, the system may recognize a "new" combination as a known viable combination based on an influx of event requests using the new version, based on the new version including a version number sequentially following a previous version, or the like. Accordingly, while a first instance of the "new" combination may trigger further evaluation, as addition requests including the "new" combination are received, the "new" combination may quickly be identified as a known viable combination.

Further, as discussed herein, the arrangements described may be used to evaluate event requests received from any device using a web browser session, from a mobile device using a mobile browser, from a mobile application, or the like. In some examples, the system may identify a type of session when parsing the user agent string to identify parameters of the request.

Accordingly, because the enterprise organization may have such vast amounts of historical data over long periods of time, the arrangements described herein may be used to evaluate requests in real-time as they are received, or may be used to evaluate requests previously received to evaluate them for potential unauthorized activity (e.g., in conducting additional investigations not happening in real-time, in investigating previous events, or the like).

Although the arrangements described may be used as an initial filter to quickly identify event requests that are likely unauthorized, the arrangements may also be used in combination with other unauthorized activity detection methods to provide robust evaluation of events to generate accurate determinations of unauthorized activity.

Figure 5:
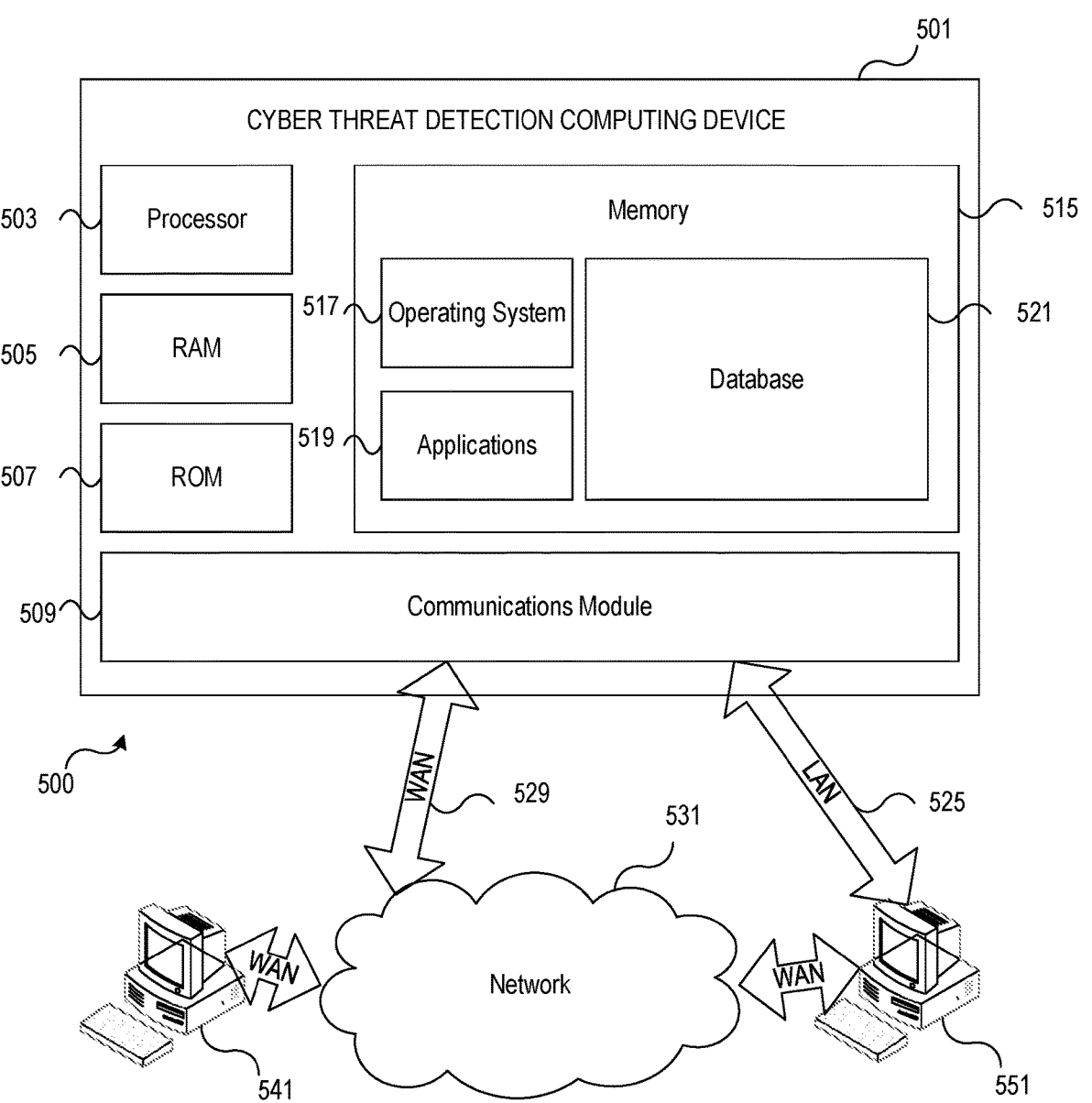
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include cyber threat detection computing device 501 having processor 503 for controlling overall operation of cyber threat detection computing device 501 and its associated components, including Random Access Memory (RAM) 505, Read-Only Memory (ROM) 507, communications module 509, and memory 515. Cyber threat detection computing device 501 may include a variety of computer readable media. Computer readable media may be any available media that may be accessed by cyber threat detection computing device 501, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by cyber threat detection computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on cyber threat detection computing device 501. Such a processor may execute computer-executable instructions stored on a computer-readable medium.

Software may be stored within memory 515 and/or storage to provide instructions to processor 503 for enabling cyber threat detection computing device 501 to perform various functions as discussed herein. For example, memory 515 may store software used by cyber threat detection computing device 501, such as operating system 517, application programs 519, and associated database 521. Also, some or all of the computer executable instructions for cyber threat detection computing device 501 may be embodied in hardware or firmware. Although not shown, RAM 505 may include one or more applications representing the application data stored in RAM 505 while cyber threat detection computing device 501 is on and corresponding software applications (e.g., software tasks) are running on cyber threat detection computing device 501.

Communications module 509 may include a microphone, keypad, touch screen, and/or stylus through which a user of cyber threat detection computing device 501 may provide input, and may also include one or more of a speaker for providing audio output and a video display device for providing textual, audiovisual and/or graphical output. Computing system environment 500 may also include optical scanners (not shown).

Cyber threat detection computing device 501 may operate in a networked environment supporting connections to one or more remote computing devices, such as computing device 541 and 551. Computing devices 541 and 551 may be personal computing devices or servers that include any or all of the elements described above relative to cyber threat detection computing device 501.

The network connections depicted in FIG. 5 may include Local Area Network (LAN) 525 and Wide Area Network (WAN) 529, as well as other networks. When used in a LAN networking environment, cyber threat detection computing device 501 may be connected to LAN 525 through a network interface or adapter in communications module 509. When used in a WAN networking environment, cyber threat detection computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
  receive a user agent string associated with an enterprise event request associated with an enterprise event occurring at a first time, wherein the first time is a date of the enterprise event;
  parse the user agent string to identify parameters associated with the enterprise event request, wherein the identified parameters include the date;
  analyze, based on the identified parameters, the enterprise event request to determine whether it corresponds to unauthorized activity, wherein analyzing the enterprise event request to determine whether it corresponds to unauthorized activity includes:
    comparing the parameters to known viable combinations of parameters for the first time;
    responsive to determining that the parameters match a known viable combination of parameters for the first time, processing the enterprise event request; and
    responsive to determining that the parameters do not match a known viable combination of parameters for the first time, flagging the user agent string and enterprise event request as potentially unauthorized and transmitting the enterprise event request to an enterprise computing system for further analysis.

2. The computing platform of claim 1, wherein the parameters further include at least two of: a device type, an operating system, an operating system version, a browser, and a browser version.

3. The computing platform of claim 2, wherein the parameters further include one or more browser extensions detected in the user agent string.

4. The computing platform of claim 1, wherein analyzing, based on the identified parameters, the enterprise event request to determine whether it corresponds to unauthorized activity is performed by executing a machine learning model using the identified parameters parsed from the user agent string as inputs to generate an output.

5. The computing platform of claim 4, wherein the output is a binary output of authorized or unauthorized.

6. The computing platform of claim 4, wherein the output includes a score indicating a likelihood that the enterprise event request is unauthorized.

7. The computing platform of claim 1, wherein the known viable combinations of parameters are determined from historical hardware and software data extracted from previously received enterprise event requests at a plurality of points-in-time.

8. The computing platform of claim 7, wherein the known viable combinations of parameters are further determined from vendor data including release dates of one or more operating systems and one or more browsers.

9. A method, comprising:
receiving, by a computing platform, the computing platform having at least one processor and memory a user agent string associated with an enterprise event request associated with an enterprise event occurring at a first time, wherein the first time includes a date of the enterprise event;
parsing, by the at least one processor, the user agent string to identify parameters associated with the enterprise event request, wherein the identified parameters include the date;
analyzing, by the at least one processor and based on the identified parameters, the enterprise event request to determine whether it corresponds to unauthorized activity, wherein analyzing the enterprise event request to determine whether it corresponds to unauthorized activity includes:
  comparing, by the at least one processor, the parameters to known viable combinations of parameters for the first time;
  responsive to determining that the parameters match a known viable combination of parameters for the first time, processing, by the at least one processor, the enterprise event request; and
  responsive to determining that the parameters do not match a known viable combination of parameters for the first time, flagging, by the at least one processor, the user agent string and enterprise event request as potentially unauthorized and transmitting the enterprise event request to an enterprise computing system for further analysis.

10. The method of claim 9, wherein the parameters further include at least two of: a device type, an operating system, an operating system version, a browser, and a browser version.

11. The method of claim 10, wherein the parameters further include one or more browser extensions detected in the user agent string.

12. The method of claim 9, wherein analyzing, by the at least one processor and based on the identified parameters, the enterprise event request to determine whether it corresponds to unauthorized activity is performed by executing, by the at least one processor, a machine learning model using the identified parameters parsed from the user agent string as inputs to generate an output.

13. The method of claim 12, wherein the output is a binary output of authorized or unauthorized.

14. The method of claim 12, wherein the output includes a score indicating a likelihood that the request is unauthorized.

15. The method of claim 9, wherein the known viable combinations of parameters are determined from historical hardware and software data extracted from previously received enterprise event requests at a plurality of points-in-time.

16. The method of claim 15, wherein the known viable combinations of parameters are further determined from vendor data including release dates of one or more operating systems and one or more browsers.

17. One or more non-transitory computer-readable media storing instructions that, when executed by a computing platform comprising at least one processor, memory, and a communication interface, cause the computing platform to:

receive, in real-time, a user agent string associated with an enterprise event request associated with an enterprise event occurring at a first time, wherein the first time includes a date of the enterprise event;

parse the user agent string to identify parameters associated with the enterprise event request, wherein the identified parameters include the date;

analyze, based on the identified parameters, the enterprise event request to determine whether it corresponds to unauthorized activity, wherein analyzing the enterprise event request to determine whether it corresponds to unauthorized activity includes:

comparing the parameters to known viable combinations of parameters for the first time;

responsive to determining that the parameters match a known viable combination of parameters for the first time, processing the enterprise event request; and responsive to determining that the parameters do not match a known viable combination of parameters for the first time, flagging the user agent string and enterprise event request as potentially unauthorized and transmitting the enterprise event request to an enterprise computing system for further analysis.

18. The one or more non-transitory computer-readable media of claim 17, wherein the parameters further include at least two of: a device type, an operating system, an operating system version, a browser, and a browser version.

19. The one or more non-transitory computer-readable media of claim 17, wherein analyzing, based on the identified parameters, the enterprise event request to determine whether it corresponds to unauthorized activity is performed by executing a machine learning model using the identified parameters parsed from the user agent string as inputs to generate an output.

20. The one or more non-transitory computer-readable media of claim 17, wherein the known viable combinations of parameters are determined from historical hardware and software data extracted from previously received enterprise event requests at a plurality of points-in-time.

\* \* \* \* \*